United States Patent
Huang

(10) Patent No.: US 7,826,733 B2
(45) Date of Patent: Nov. 2, 2010

(54) ADJUSTABLE ANTI-SHAKE IMAGE-SENSING MODULE AND METHOD FOR ADJUSTING THE SAME

(75) Inventor: Yaw-Ching Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/555,116

(22) Filed: Sep. 8, 2009

(65) Prior Publication Data

US 2010/0104270 A1 Apr. 29, 2010

(30) Foreign Application Priority Data

Oct. 28, 2008 (TW) ............................. 97141378 A

(51) Int. Cl.
G03B 17/00 (2006.01)
H04N 5/228 (2006.01)
(52) U.S. Cl. .................................. 396/55; 348/208.99
(58) Field of Classification Search .................. 396/55; 348/208.99, 208.2, 208.4, 208.5, 208.7
See application file for complete search history.

(56) References Cited

U.S. PATENT DOCUMENTS 7,650,065 B2 * 1/2010 Takahashi .................... 396/55

2009/0296217 A1 * 12/2009 Huang .......................... 359/554
2010/0003023 A1 * 1/2010 Takahashi ...................... 396/55
2010/0073495 A1 * 3/2010 Huang .................... 348/208.11

FOREIGN PATENT DOCUMENTS

JP 2004056581 2/2004

OTHER PUBLICATIONS

English abstract of JP2004056581.
* cited by examiner

Primary Examiner—Rodney E Fuller
(74) Attorney, Agent, or Firm—Thomas, Kayden, Horstemeyer & Risley

(57) ABSTRACT

An adjustable anti-shake image-sensing module includes a base and a movable platform moving along a first straight line and a second straight line with respect to the base. The movable platform comprises a pair of Hall elements respectively corresponding to the first and second straight lines. When the adjustable anti-shake image-sensing module is adjusted, the movable platform is pressed with respect to the base and is thereby located in an aligned position. A pair of magnets is then disposed on the base and the positions of the magnets with respect to the Hall elements are fine-tuned. When aligned with the Hall elements, the magnets are fixed to the base. A pair of circuit boards is disposed on the movable platform and the positions of the circuit boards with respect to the magnets are adjusted. The circuit boards are then fixed to the movable platform.

13 Claims, 8 Drawing Sheets

ADJUSTABLE ANTI-SHAKE IMAGE-SENSING MODULE AND METHOD FOR ADJUSTING THE SAME

CROSS REFERENCE TO RELATED APPLICATIONS

This Application claims priority of Taiwan Patent Application No. 97141378, filed on Oct. 28, 2008, the entirety of which is incorporated by reference herein.

BACKGROUND OF THE INVENTION

1. Field of the Invention

The invention relates to an anti-shake module, and more particularly to an adjustable anti-shake image-sensing module and a method for adjusting the same.

2. Description of the Related Art

In a conventional anti-shake digital camera, a floating image-sensing unit moves at a high speed on a plane perpendicular to an optical axis, suppressing or correcting a blurred image caused by shakes during a photographic operation, and thus achieving an anti-shake effect.

Referring to FIG. 1 and FIG. 2, JP2004056581A discloses an anti-shake image-sensing module 1 and an optical lens set A assembled therein for performing adjustment.

The anti-shake image-sensing module 1 comprises a base 11, a movable platform 12 disposed on the base 11, and an image-sensing unit 13 disposed on the movable platform 12. The optical lens assembly A is disposed on the base 11. The movable platform 12 can move on a plane perpendicular to an optical axis L and within a specific area B with a two-dimensional manner.

To obtain an optimal anti-shake effect, the movable platform 12 must be aligned with the base 11 prior to a photographic operation. Namely, the center $C_1$ of the image-sensing unit 13 is aligned with the center $C_2$ of the base 11, such that the movable platform 12 can provide an optimal effect for suppressing or correcting a blurred image.

Nevertheless, during assembly of the anti-shake image-sensing module 1, relative position errors are generated between constituent members (such as, magnets, Hall elements, driving coils, etc.) thereof, such that the center $C_1$ of the image-sensing unit 13 deviates from the center $C_2$ of the base 11, adversely affecting the anti-shake effect provided by the anti-shake image-sensing module 1.

Referring to FIG. 2 and FIG. 3, when the center $C_1$ of the image-sensing unit 13 is moved onto the center $C_2$ of the base 11, the position of the movable platform 12 needs to be adjusted by an external force. In JP2004056581A, an electronic signal is input to a coil (not shown) disposed on the movable platform 12 to adjust the relative position of the magnets (not shown) disposed on the base 11. When the center $C_1$ of the image-sensing unit 13 is aligned with the center $C_2$ of the base 11, the value of the input electronic signal is kept and stored in a memory of a digital camera.

Further, the movable platform 12 can originally move within the specific area B in a two-dimensional and symmetric manner. However, when the center $C_1$ of the image-sensing unit 13 is aligned with the center $C_2$ of the base 11, the specific area B within which the movable platform 12 can move becomes asymmetric, i.e. the distance by which the movable platform 12 can move in a certain direction is reduced.

Accordingly, the anti-shake image-sensing module 1 is not standardized when assembled. Specifically, the relative position of the movable platform 12 and base 11 is adjusted after a lens is completely assembled. Even though manufactured at the same time, multiple anti-shake image-sensing modules 1 are required to be adjusted one by one. Moreover, during adjustment, the value of the input electronic signal must be continually changed for trial and error and verified with an image determination technique. The results are then stored in the memory. Accordingly, the aforementioned adjusting process increases complexity of manufacturing the anti-shake image-sensing module 1. Additionally, adjustment results obtained from various digital cameras are often not the same, thereby increasing subsequent maintenance costs.

Additionally, after the adjustment, the asymmetric specific area B adversely affects the anti-shake effect provided by the anti-shake image-sensing module 1.

BRIEF SUMMARY OF THE INVENTION

A detailed description is given in the following embodiments with reference to the accompanying drawings.

An object of the invention is to provide an adjustable anti-shake image-sensing module with a simplified engineering operation and a secure anti-shake effect.

Another object of the invention is to provide a method for adjusting an adjustable anti-shake image-sensing module with the simplified engineering operation and secure anti-shake effect.

An exemplary embodiment of the invention provides an adjustable anti-shake image-sensing module comprising a base, a movable platform, an image-sensing unit, a first magnet, a second magnet, a first circuit board, and a second circuit board. The base comprises a first magnet fitting area and a second magnet fitting area. The movable platform is assembled to the base and moves along a first straight line and a second straight line perpendicular to the first straight line with respect to the base. The movable platform comprises a positioning reference point, a first Hall element corresponding to the first magnet fitting area, a second Hall element corresponding to the second magnet fitting area, a first circuit board fitting area corresponding to the first magnet fitting area, and a second circuit board fitting area corresponding to the second magnet fitting area. The image-sensing unit is assembled to the movable platform. The first magnet is fit in the first magnet fitting area. A first magnet gap exists between the first magnet and the first magnet fitting area. The second magnet is fit in the second magnet fitting area. A second magnet gap exists between the second magnet and the second magnet fitting area. The first circuit board is assembled to the first circuit board fitting area, with a magnetic-permeable drive coil. A first circuit board gap exists between the first circuit board and the first circuit board fitting area. The second circuit board is assembled to the second circuit board fitting area, with a magnetic-permeable drive coil. A second circuit board gap exists between the second circuit board and the second circuit board fitting area.

Another exemplary embodiment of the invention provides a method for adjusting an adjustable anti-shake image-sensing module comprising a base and a movable platform assembled to the base. The base comprises a first magnet fitting area and a second magnet fitting area. The movable platform moves along a first straight line and a second straight line perpendicular to the first straight line with respect to the base and comprises a positioning reference point, a first Hall element corresponding to the first magnet fitting area, a second Hall element corresponding to the second magnet fitting area, a first circuit board fitting area corresponding to the first magnet fitting area, and a second circuit board fitting area corresponding to the second magnet fitting area. The method comprises the steps of (a) pressing the positioning reference point to position the movable platform in an aligned position with respect to the base; (b) respectively placing a first magnet and a second magnet at the first and second magnet fitting areas with respect to the first and second Hall elements, respectively adjusting the position of the first magnet with respect to the first Hall element with a first magnet gap between the first magnet and the first magnet fitting area and the position of the second magnet with respect to the second Hall element with a second magnet gap between the second magnet and the second magnet fitting area, and respectively fixing the first and second magnets to the first and second magnet fitting areas when the first and second Hall elements respectively detect that the first magnet are aligned with the first Hall element and the second magnet are aligned with the second Hall element; and (c) respectively placing a first circuit board and a second circuit board at the first and second circuit board fitting areas with respect to the first and second magnets, and respectively adjusting the position of the first circuit board with respect to the first magnet with a first circuit board gap between the first circuit board and the first circuit board fitting area and the position of the second circuit board with respect to the second magnet with a second circuit board gap between the second circuit board and the second circuit board fitting area to respectively align the first and second circuit boards with the first and second magnets.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
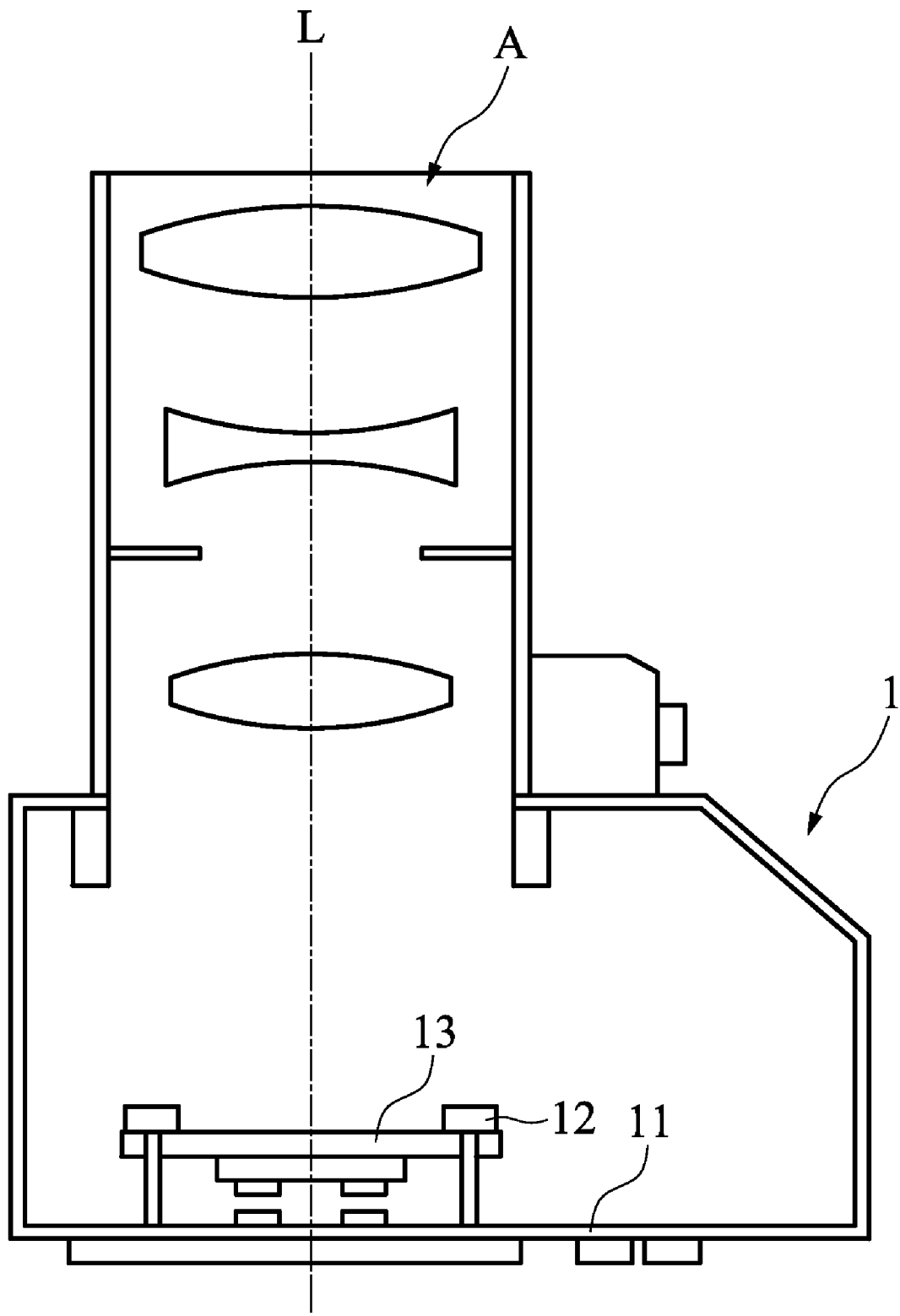
FIG. 1 is a schematic side view of a conventional anti-shake image-sensing module.
Figure 3:
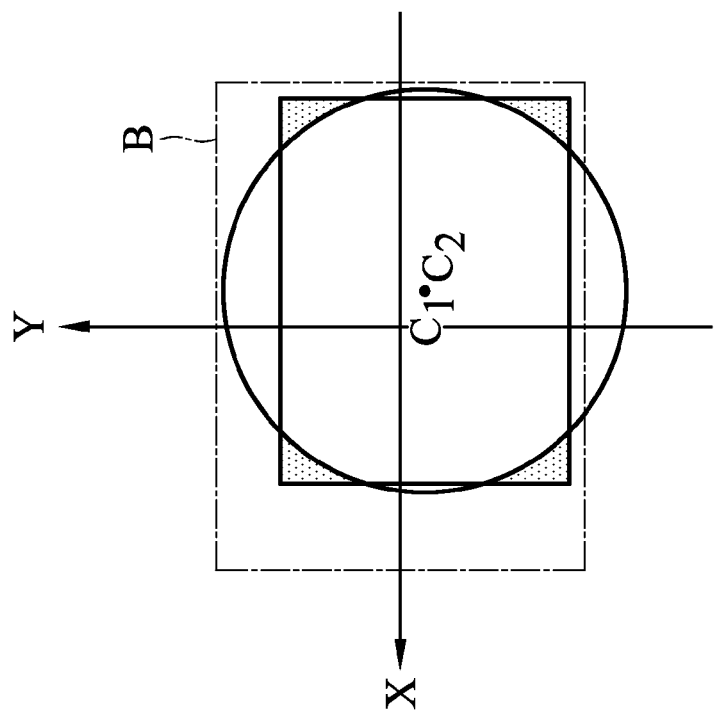
FIG. 3 is a schematic view showing the center of the image-sensing unit of the conventional anti-shake image-sensing module coinciding with that of the base thereof.
Figure 2:
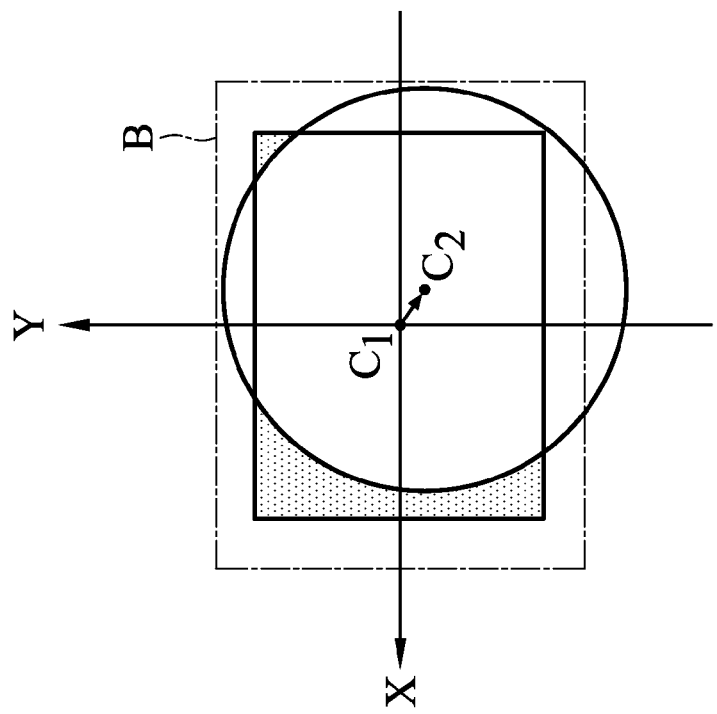
FIG. 2 is a schematic view showing the center of an image-sensing unit of the conventional anti-shake image-sensing module deviated from that of a base thereof.

The following description is of the best-contemplated mode of carrying out the invention. This description is made for the purpose of illustrating the general principles of the invention and should not be taken in a limiting sense. The scope of the invention is best determined by reference to the appended claims.

In the following description, similar elements share the same reference numerals.

Figure 4:
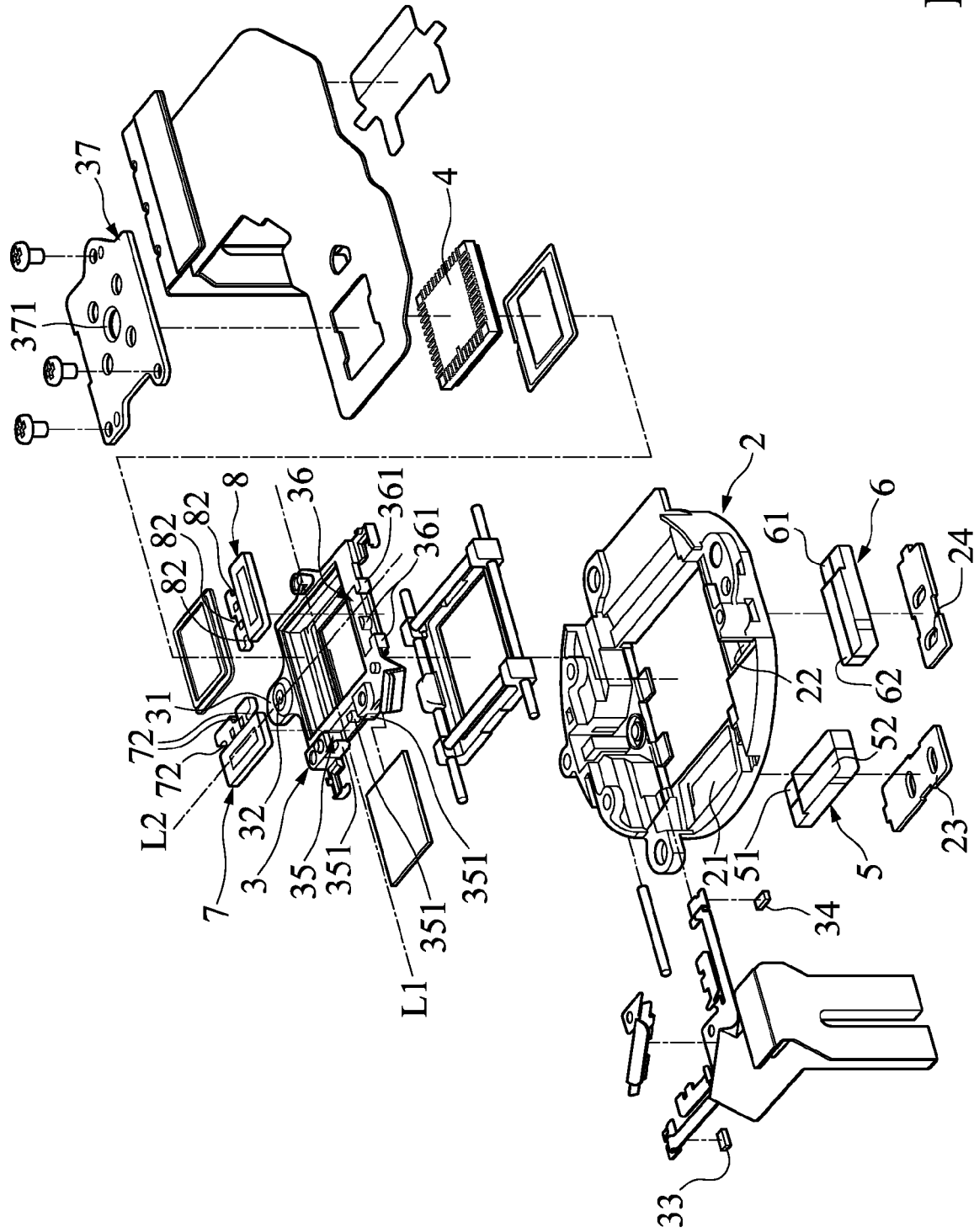
FIG. 4 is an exploded perspective view showing an adjustable anti-shake image-sensing module and a method for adjusting the same according to a first preferred embodiment of the invention.
Figure 7:
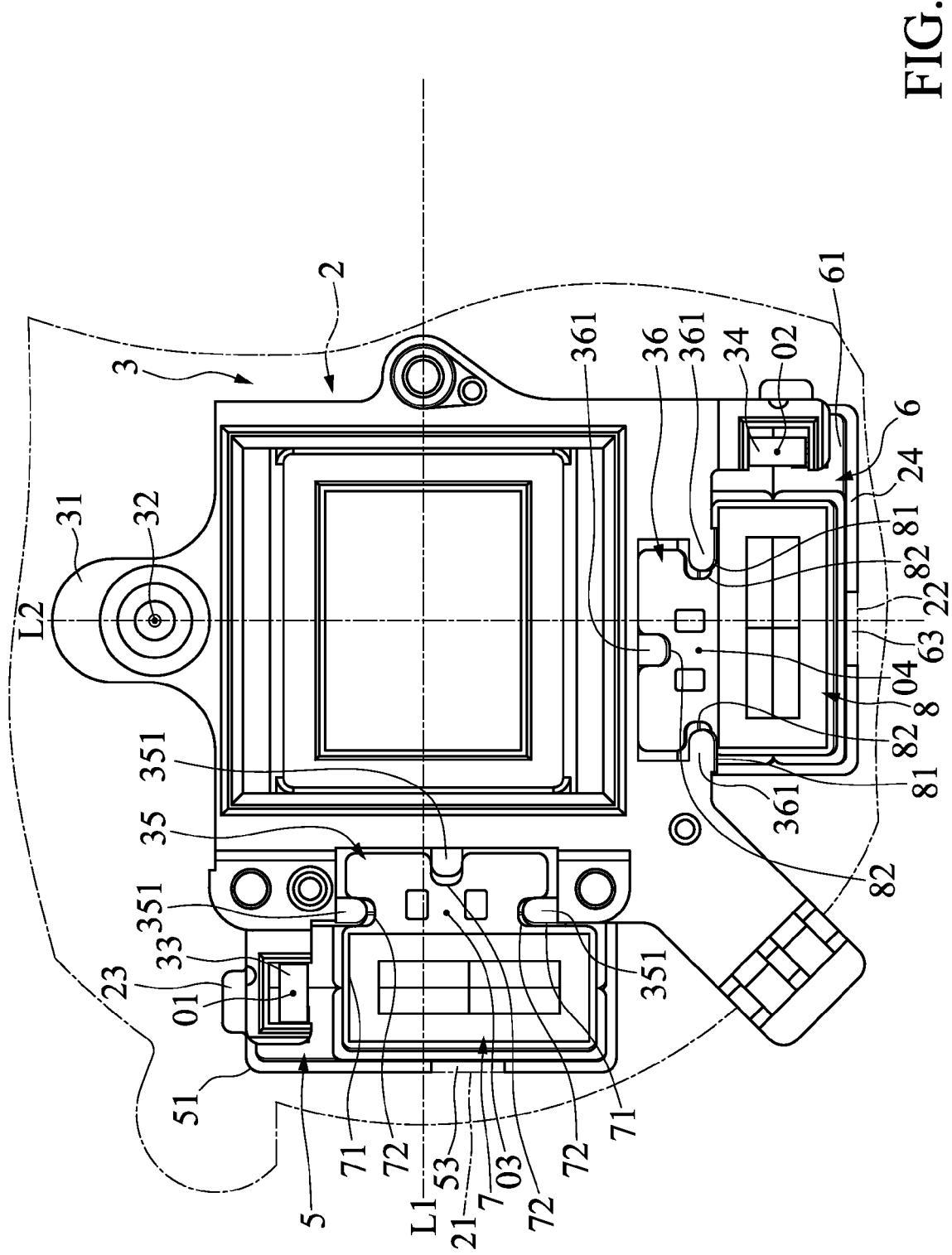
FIG. 7 is a schematic top view showing assembly of a first circuit board and a second circuit board with respect to the first and second magnets according to the first preferred embodiment of the invention.

Referring to FIG. 4 and FIG. 7, an adjustable anti-shake image-sensing module comprises a base 2, a movable platform 3, an image-sensing unit 4, a first magnet 5, a second magnet 6, a first circuit board 7, and a second circuit board 8.

The base 2 is provided for installation of the movable platform 3, such that the movable platform 3 can move along a first straight line L1 and a second straight line L2 perpendicular to the first straight line L1 with respect to the base 2.

The base 2 comprises a first magnet fitting area 21, a second magnet fitting area 22, a first magnetic-permeable plate 23 located at the first magnet fitting area 21, and a second magnetic-permeable plate 24 located at the second magnet fitting area 22.

The first magnet 5 and second magnet 6 are placed in the first magnet fitting area 21 and second magnet fitting area 22, respectively. The first magnet 5 and second magnet 6 are fixed by the first magnetic-permeable plate 23 and second magnetic-permeable plate 24, respectively.

The first magnet 5 comprises a first Hall sensing portion 51 and a first circuit board sensing portion 52 integrally formed therewith. Similarly, the second magnet 6 comprises a second Hall sensing portion 61 and a second circuit board sensing portion 62 integrally formed therewith. Moreover, a first magnet gap 53 exists between the first magnet 5 and the first magnet fitting area 21, and a second magnet gap 63 exists between the second magnet 6 and the second magnet fitting area 22.

Specifically, the width of the first magnet fitting area 21 along the first straight line L1 exceeds that of the first magnet 5, thus forming the first magnet gap 53. Similarly, the width of the second magnet fitting area 22 along the second straight line L2 exceeds that of the second magnet 6, thus forming the second magnet gap 63.

The movable platform 3 is assembled to (or disposed on) the base 2. Additionally, the image-sensing unit 4 is also assembled to the base 2.

Figure 5:
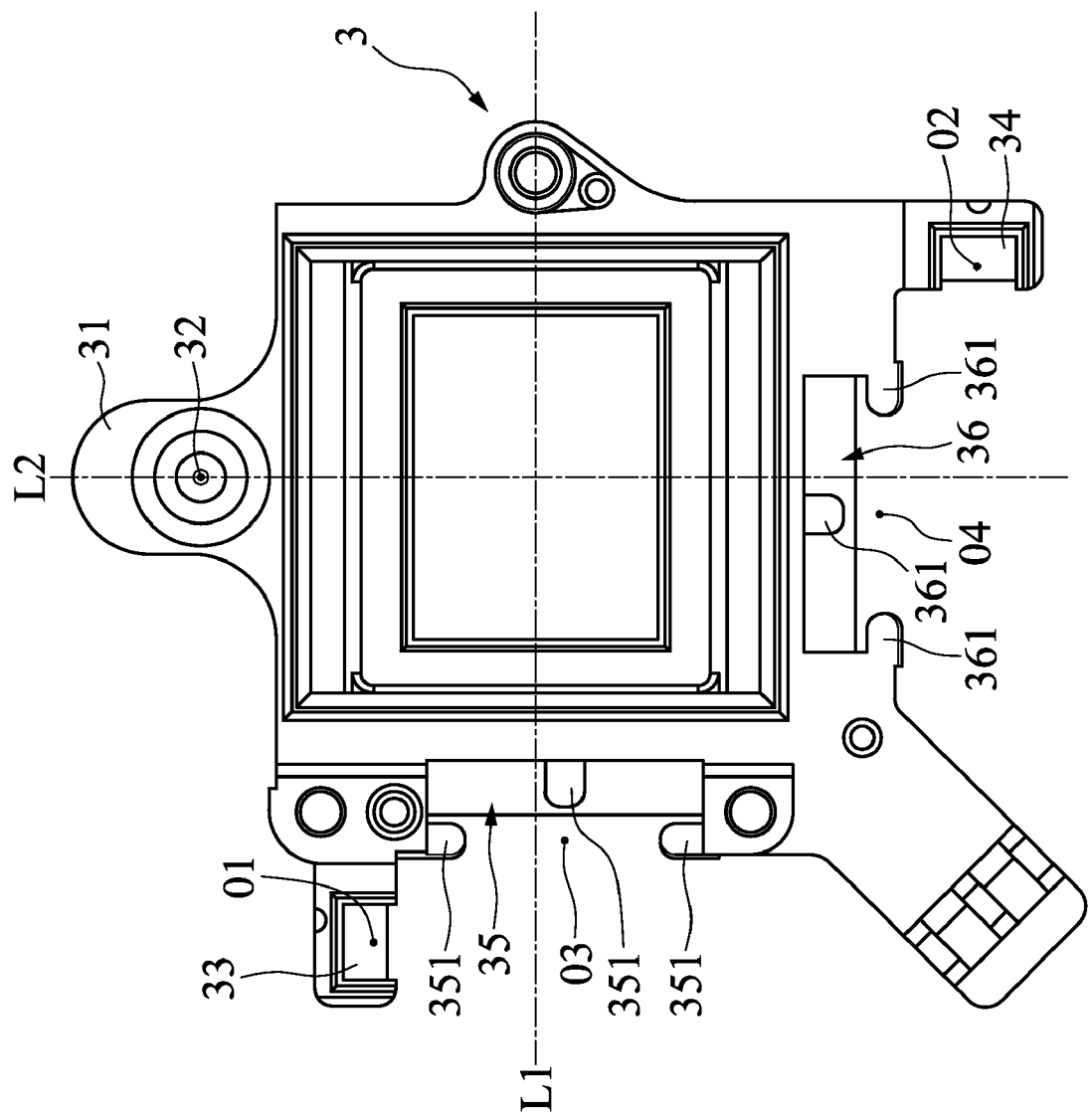
FIG. 5 is a schematic top view of a first Hall element and a second Hall element disposed on a movable platform according to the first preferred embodiment of the invention.

Referring to FIGS. 4, 5, and 7, the movable platform 3 comprises a protrusion 31, a positioning reference point 32 located on the protrusion 31, a first Hall element 33 corresponding to the first magnet fitting area 21, a second Hall element 34 corresponding to the second magnet fitting area 22, a first circuit board fitting area 35 corresponding to the first magnet fitting area 21, a second circuit board fitting area 36 corresponding to the second magnet fitting area 22, and a pressing board 37 for pressing the image-sensing unit 4.

The first circuit board 7 and second circuit board 8 are assembled to the first circuit board fitting area 35 and second circuit board fitting area 36, respectively. Here, the first circuit board 7 and second circuit board 8 are provided with magnetic-permeable drive coils, respectively.

A first circuit board gap 71 exists between the first circuit board 7 and the first circuit board fitting area 35 and along the first straight line L1, and a second circuit board gap 81 exists between the second circuit board 8 and the second circuit board fitting area 36 and along the second straight line L2.

Specifically, the first circuit board 7 comprises three first adjusting recesses 72. Two of the first adjusting recesses 72 are symmetrical to the first straight line L1, and the other is formed therebetween. The first circuit board fitting area 35 comprises three first adjusting pillars 351 respectively corresponding to and inserted into the first adjusting recesses 72. The first circuit board gap 71 is formed between the first adjusting pillars 351 and the first adjusting recesses 72 along the first straight line L1, enabling the position of the first circuit board 7 to be fine-tuned.

Similarly, the second circuit board 8 comprises three second adjusting recesses Two of the second adjusting recesses 82 are symmetrical to the second straight line L2, and the other is formed therebetween. The second circuit board fitting area 36 comprises three second adjusting pillars 361 respectively corresponding to and inserted into the second adjusting recesses 82. The second circuit board gap 81 is formed between the second adjusting pillars 361 and the second adjusting recesses 82 along the second straight line L2, enabling the position of the second circuit board 8 to be fine-tuned.

Figure 8:
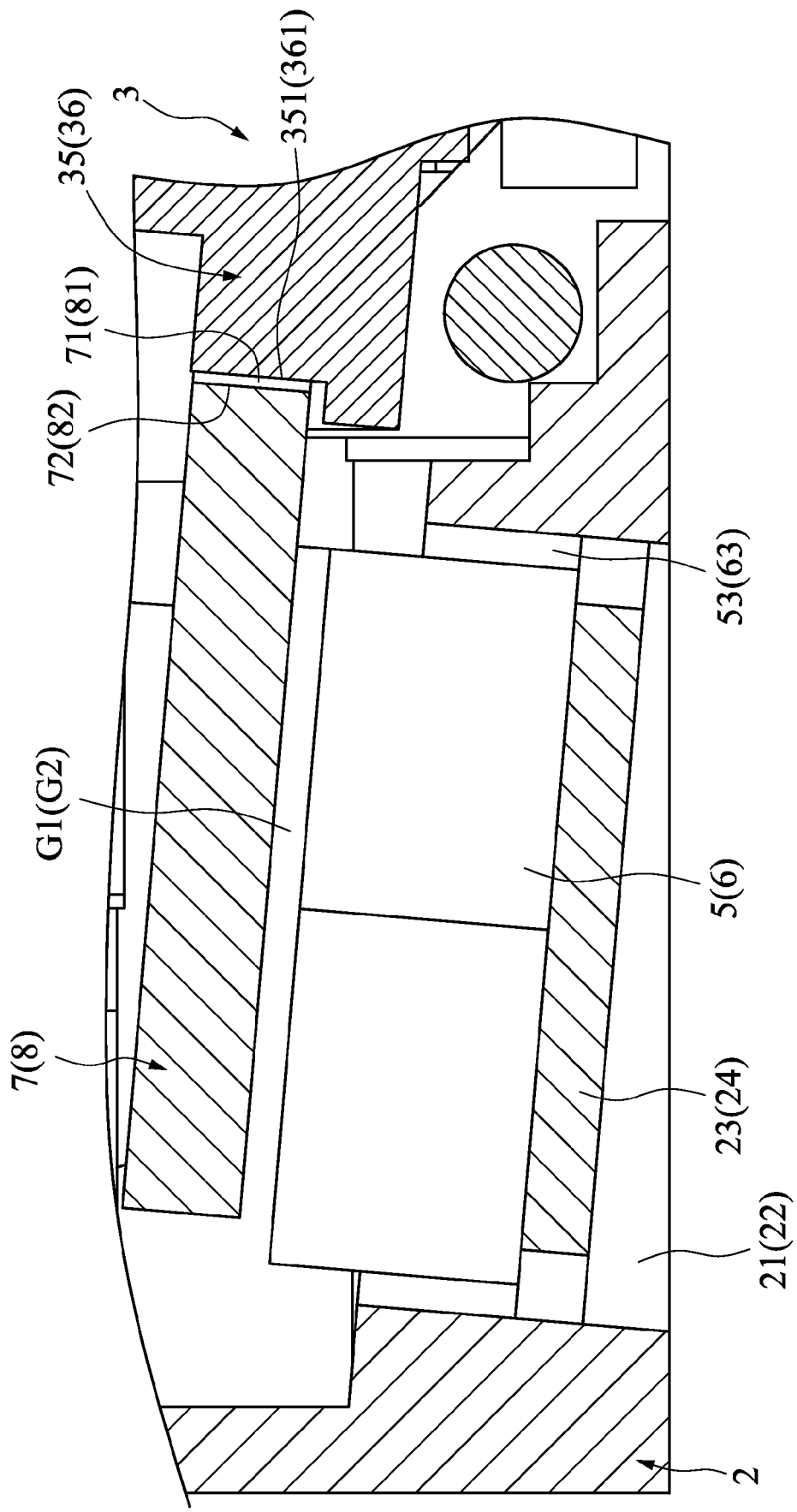
FIG. 8 is a partial cross section and side view showing a first magnetic-permeable gap between the first circuit board and the first magnet and a second magnetic-permeable gap between the second circuit board and the second magnet according to the first preferred embodiment of the invention.

Referring to FIG. 8, a first magnetic-permeable gap G1 exists between the bottom of the first circuit board 7 and the top of the first magnet 5, and a second magnetic-permeable gap G2 exists between the bottom of the second circuit board 8 and the top of the second magnet 6.

The aforementioned adjustable anti-shake image-sensing module of the first preferred embodiment can effectively provide an anti-shake effect through a method for adjusting the adjustable anti-shake image-sensing module of the invention.

The method for adjusting the adjustable anti-shake image-sensing module comprises the following steps.

Figure 6:
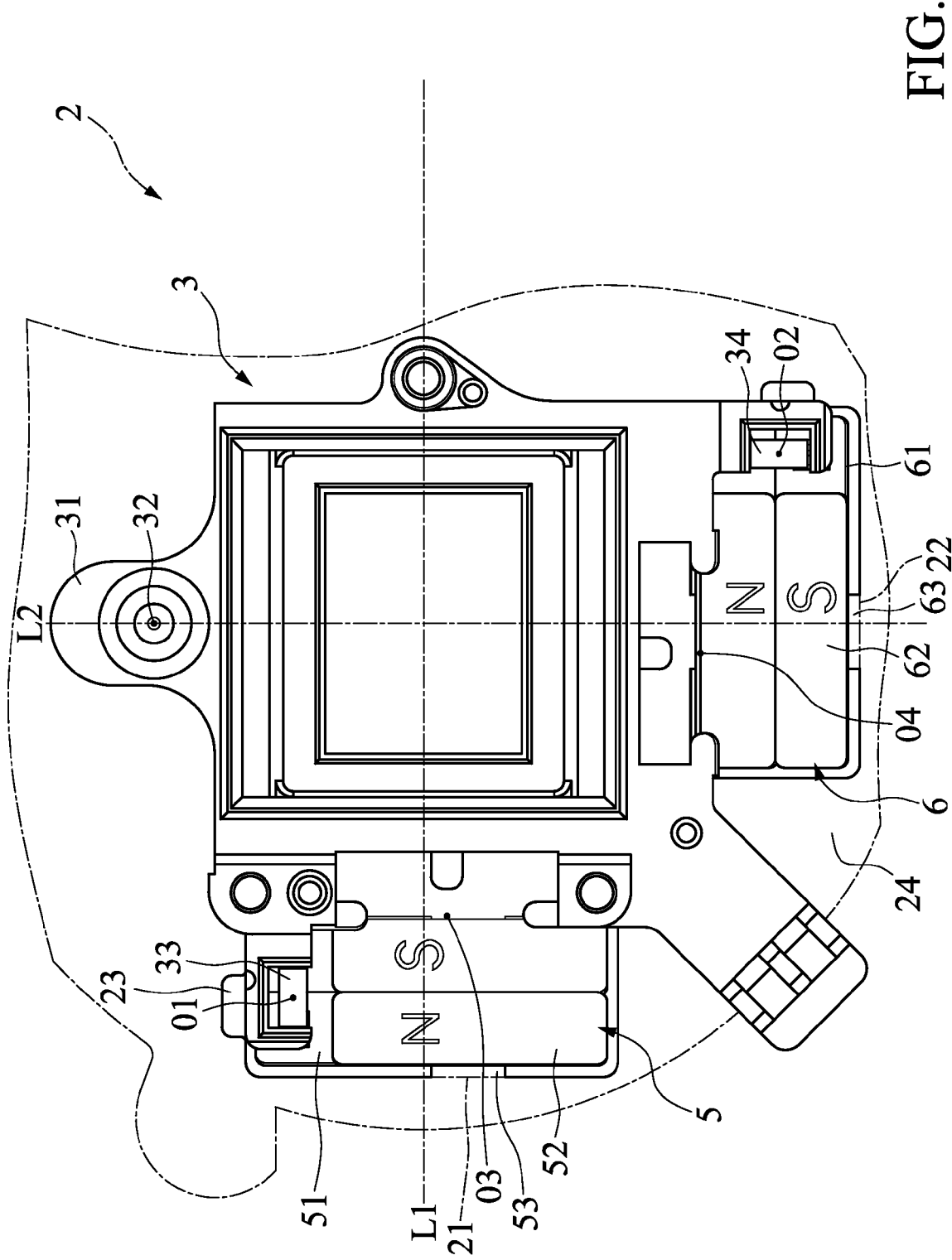
FIG. 6 is a schematic top view showing assembly of a first magnet and a second magnet with respect to the first and second Hall elements according to the first preferred embodiment of the invention.

As shown in FIG. 5 and FIG. 6, a fixture (not shown) presses the positioning reference point 32 located on the protrusion 31, positioning the movable platform 3 in an aligned position with respect to the base 2.

In the aligned position, the first magnet 5 and second magnet 6 are respectively placed at the first circuit board fitting area 35 and second circuit board fitting area 36 with respect to the first Hall element 33 and second Hall element 34.

The position of the first magnet 5 with respect to the first Hall element 33 is adjusted with the first magnet gap 53 between the first magnet 5 and the first magnet fitting area 21, and the position of the second magnet 6 with respect to the second Hall element 34 is adjusted with the second magnet gap 63 between the second magnet 6 and the second magnet fitting area 22.

When the first Hall element 33 and second Hall element 34 respectively detect that the first magnet 5 is aligned with the first Hall element 33 and the second magnet 6 is aligned with the second Hall element 34, i.e. when the first magnet 5 and second magnet 6 are respectively located at a first reference point O1 and a second reference point O2, the first magnet 5 and second magnet 6 can be respectively fixed to the first magnetic-permeable plate 23 and second magnetic-permeable plate 24, completing adjustment between the first magnet 5 and the first Hall element 33 and between the second magnet 6 and the second Hall element 34.

In this preferred embodiment, the voltage input to the first Hall element 33 and second Hall element 34 is 3 volts. When the first Hall element 33 and second Hall element respectively align the first Hall sensing portion 51 of the first magnet 5 and the second Hall sensing portion 61 of the second magnet 6, the voltage output from the first Hall element 33 and second Hall element 34 is 1.5 volts. Accordingly, whether the first magnet and second magnet 6 are respectively located at the first reference point O1 and second reference point O2 can be determined by accessing the voltage output from the first Hall element 33 and second Hall element 34.

Then, as shown in FIG. 7 and FIG. 8, the first circuit board 7 and second circuit board 8 are respectively placed at the first circuit board fitting area 35 and second circuit board fitting area 36 with respect to the first magnet 5 and second magnet 6.

The position of the first circuit board 7 with respect to the first magnet 5 is adjusted with the first circuit board gap 71 between the first circuit board 7 and the first circuit board fitting area 35, and the position of the second circuit board 8 with respect to the second magnet 6 is adjusted with the second circuit board gap 81 between the second circuit board 8 and the second circuit board fitting area 36.

When the first circuit board 7 and second circuit board 8 respectively align the first magnet 5 and second magnet 6, i.e. when the first circuit board 7 and second circuit board 8 are respectively located at a third reference point O3 and a fourth reference point O4, adjustment of magnetic flux between the first circuit board 7 and the first magnet 5 and between the second circuit board 8 and the second magnet 6 is performed.

The adjustment of magnetic flux between the first circuit board 7 and the first magnet 5 and between the second circuit board 8 and the second magnet 6 is performed by adjusting the sizes of the first magnetic-permeable gap G1 and second magnetic-permeable gap G2.

Then, the first circuit board 7 and second circuit board 8 are respectively fixed to the first circuit board fitting area 35 and second circuit board fitting area 36. At this point, adjustment of the first circuit board 7 and second circuit board 8 is complete.

In this preferred embodiment, the first Hall sensing portion 51 and second Hall sensing portion 61 are integrally formed with the first circuit board sensing portion 52 and second circuit board sensing portion 62, respectively. Thus, when the first Hall sensing portion 51 and second Hall sensing portion 61 respectively align the first Hall element 33 and second Hall element 34 and the first circuit board 7 and second circuit board 8 respectively align the first circuit board sensing portion 52 and second circuit board sensing portion 62, adjustment of the relative positions between the first Hall element 33 and the second Hall element 34, between the first magnet 5 and the second magnet 6, and between the first circuit board 7 and the second circuit board 8 is complete. At this point, no further adjustment of the relative positions between the first Hall sensing portion 51 and the first circuit board sensing portion 52 and between the second Hall sensing portion 61 and the second circuit board sensing portion 62 is required.

Then, the image-sensing unit 4 is assembled to the movable platform 3, thereby completing the adjustment and assembly of the adjustable anti-shake image-sensing module.

As the adjustment of the adjustable anti-shake image-sensing module is completed before assembly of the adjustable anti-shake image-sensing module and an optical lens set (not shown), only adjustment of the relative position thereof is required in the following steps. Namely, no input voltage for adjustment and memory storing operation is required and the moving range of the movable platform 3 can be symmetrically maintained, thereby securing the anti-shake effect provided by the adjustable anti-shake image-sensing module.

Figure 9:
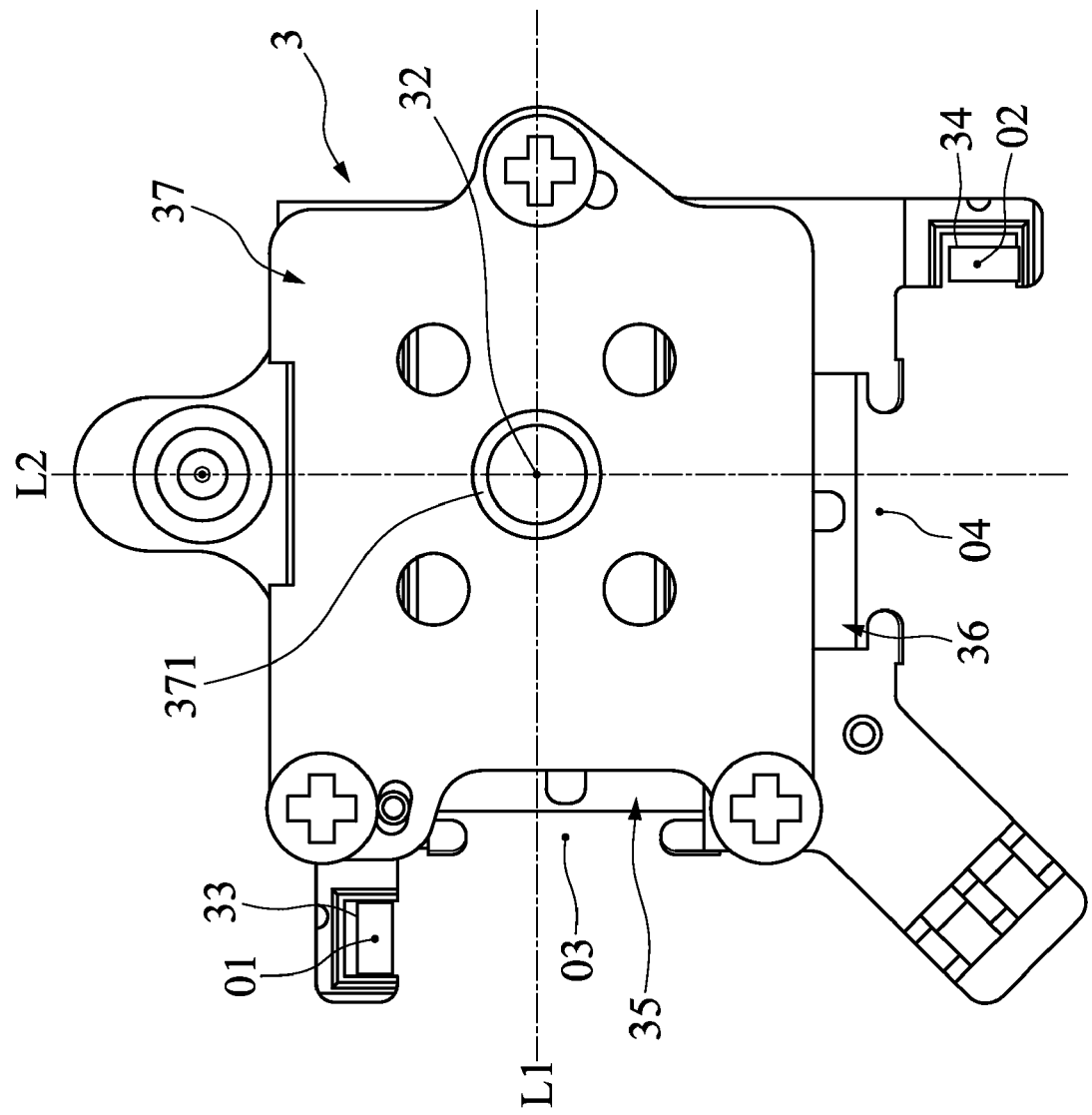
FIG. 9 is a schematic top view showing an adjustable anti-shake image-sensing module and a method for adjusting the same according to a second preferred embodiment of the invention.

Referring to FIG. 4 and FIG. 9, an adjustable anti-shake image-sensing module and an adjusting method thereof of the second preferred embodiment are substantially the same as those of the first preferred embodiment. In the second preferred embodiment, the positioning reference point 32 is located on the pressing board 37. Specifically, the pressing board 37 is formed with a tapered hole 371 of which the positioning reference point 32 is located in the center.

In this preferred embodiment, the image-sensing unit 4 is first assembled to the movable platform 3, and the pressing board 37 of the movable platform 3 is then pressed onto the image-sensing unit 4. Then, adjustment and assembly of the first magnet 5, second magnet 6, first circuit board 7, and second circuit board 8 are performed.

In conclusion, an external force is applied to the positioning reference point 32 to press the movable platform 3 in the aligned position. Then, the adjustment and assembly of the first magnet 5 and second magnet 6 with respect to the first Hall element 33 and second Hall element 34 and adjustment and assembly of the first circuit board 7 and second circuit board 8 with respect to the first magnet 5 and second magnet 6 are performed. Here, the first magnet 5, second magnet 6, first circuit board 7, and second circuit board 8 can be adjusted to precise positions with the first magnet gap 53, second magnet gap 63, first circuit board gap 71, and second circuit board gap 81. After the aforementioned adjustment is completed, the adjustable anti-shake image-sensing module is assembled with the optical lens set. Accordingly, the input voltage for adjustment can be omitted and the moving range of the movable platform 3 can be symmetrically maintained.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adjustable anti-shake image-sensing module, comprising:
    a base comprising a first magnet fitting area and a second magnet fitting area;
    a movable platform assembled to the base and moving along a first straight line and a second straight line perpendicular to the first straight line with respect to the base, wherein the movable platform comprises a positioning reference point, a first Hall element corresponding to the first magnet fitting area, a second Hall element corresponding to the second magnet fitting area, a first circuit board fitting area corresponding to the first magnet fitting area, and a second circuit board fitting area corresponding to the second magnet fitting area;
    an image-sensing unit assembled to the movable platform;
    a first magnet fit in the first magnet fitting area, wherein a first magnet gap exists between the first magnet and the first magnet fitting area;
    a second magnet fit in the second magnet fitting area, wherein a second magnet gap exists between the second magnet and the second magnet fitting area;
    a first circuit board assembled to the first circuit board fitting area, with a magnetic-permeable drive coil, wherein a first circuit board gap exists between the first circuit board and the first circuit board fitting area; and
    a second circuit board assembled to the second circuit board fitting area, with a magnetic-permeable drive coil, wherein a second circuit board gap exists between the second circuit board and the second circuit board fitting area.

2. The adjustable anti-shake image-sensing module as claimed in claim 1, wherein the first magnet comprises a first Hall sensing portion and a first circuit board sensing portion integrally formed therewith, and the second magnet comprises a second Hall sensing portion and a second circuit board sensing portion integrally formed therewith.

3. The adjustable anti-shake image-sensing module as claimed in claim 2, wherein the width of the first magnet fitting area along the first straight line exceeds that of the first magnet, and the width of the second magnet fitting area along the second straight line exceeds that of the second magnet.

4. The adjustable anti-shake image-sensing module as claimed in claim 3, wherein the base further comprises a first magnetic-permeable plate for fixing the first magnet and a second magnetic-permeable plate for fixing the second magnet.

5. The adjustable anti-shake image-sensing module as claimed in claim 1, wherein the movable platform further comprises a pressing board pressing the image-sensing unit, and the positioning reference point is formed on the pressing board.

6. The adjustable anti-shake image-sensing module as claimed in claim 5, wherein the pressing board comprises a tapered hole, and the positioning reference point is located in the center of the tapered hole.

7. The adjustable anti-shake image-sensing module as claimed in claim 1, wherein the movable platform further comprises a protrusion on which the positioning reference point is located.

8. The adjustable anti-shake image-sensing module as claimed in claim 1, wherein the first circuit board comprises a pair of first adjusting recesses symmetrical to the first straight line, the first circuit board fitting area of the movable platform comprises a pair of first adjusting pillars inserted into the first adjusting recesses, the first circuit board gap is formed between the first adjusting pillars and the first adjusting recesses along the first straight line, the second circuit board comprises a pair of second adjusting recesses symmetrical to the second straight line, the second circuit board fitting area of the movable platform comprises a pair of second adjusting pillars inserted into the second adjusting recesses, and the second circuit board gap is formed between the second adjusting pillars and the second adjusting recesses along the second straight line.

9. The adjustable anti-shake image-sensing module as claimed in claim 1, wherein a first magnetic-permeable gap exists between the bottom of the first circuit board and the top of the first magnet, and a second magnetic-permeable gap exists between the bottom of the second circuit board and the top of the second magnet.

10. A method for adjusting an adjustable anti-shake image-sensing module comprising a base and a movable platform assembled to the base, the base comprising a first magnet fitting area and a second magnet fitting area, the movable platform moving along a first straight line and a second straight line perpendicular to the first straight line with respect to the base and comprising a positioning reference point, a first Hall element corresponding to the first magnet fitting area, a second Hall element corresponding to the second magnet fitting area, a first circuit board fitting area corresponding to the first magnet fitting area, and a second circuit board fitting area corresponding to the second magnet fitting area, comprising the steps of:
    (a) pressing the positioning reference point to position the movable platform in an aligned position with respect to the base;
    (b) respectively placing a first magnet and a second magnet at the first and second magnet fitting areas with respect to the first and second Hall elements, respectively adjusting the position of the first magnet with respect to the first Hall element with a first magnet gap between the first magnet and the first magnet fitting area and the position of the second magnet with respect to the second Hall element with a second magnet gap between the second magnet and the second magnet fitting area, and respectively fixing the first and second magnets to the first and second magnet fitting areas when the first and second Hall elements respectively detect that the first magnet is aligned with the first Hall element and the second magnet is aligned with the second Hall element; and (c) respectively placing a first circuit board and a second circuit board at the first and second circuit board fitting areas with respect to the first and second magnets, and respectively adjusting the position of the first circuit board with respect to the first magnet with a first circuit board gap between the first circuit board and the first circuit board fitting area and the position of the second circuit board with respect to the second magnet with a second circuit board gap between the second circuit board and the second circuit board fitting area to respectively align the first and second circuit boards with the first and second magnets.

11. The method as claimed in claim 10, further comprising, after the step (c), a step (d1) of respectively adjusting a first magnetic-permeable gap between the bottom of the first circuit board and the top of the first magnet and a second magnetic-permeable gap between the bottom of the second circuit board and the top of the second magnet to respectively fix the first and second circuit boards to the first and second circuit board fitting areas.

12. The method as claimed in claim 10, further comprising, after the step (c), a step (d2) of assembling an image-sensing unit to the movable platform.

13. The method as claimed in claim 10, further comprising, before the step (a), a step (a0) of pressing a pressing board of the movable platform onto an image-sensing unit after the image-sensing unit is assembled to the movable platform, wherein the positioning reference point is located on the pressing board.

* * * * *